United States Patent [19]

Lidholt

[11] Patent Number: 4,666,239

[45] Date of Patent: May 19, 1987

[54] METHOD FOR CONNECTING AN OPTICAL FIBER AND CONNECTING MEMBER AND MOUNTING MEANS FOR CARRYING OUT SAID METHOD

[76] Inventor: Lars R. Lidholt, Skogsmyrsvägen 4A, S-752 45 Upsala, Sweden

[21] Appl. No.: 545,023

[22] Filed: Oct. 24, 1983

[30] Foreign Application Priority Data

Oct. 27, 1982 [SE] Sweden .................. 8206097-1

[51] Int. Cl.⁴ ........................................ G02B 6/36
[52] U.S. Cl. .......................... 350/96.20; 350/96.10; 350/96.21
[58] Field of Search .................. 350/96.20, 96.21

[56] References Cited

U.S. PATENT DOCUMENTS

| | | | |
|---|---|---|---|
| 4,147,405 | 4/1979 | Spainhour | 350/96.21 |
| 4,183,619 | 1/1980 | Makuch | 350/96.21 |
| 4,192,056 | 3/1980 | Logan et al. | 350/96.21 X |
| 4,205,896 | 6/1980 | Borsuk | 350/96.21 X |

FOREIGN PATENT DOCUMENTS

| | | | |
|---|---|---|---|
| 2,487,527 | 1/1982 | France | 350/96.21 |
| 0156911 | 12/1980 | Japan | 350/96.21 |

*Primary Examiner*—William L. Sikes
*Assistant Examiner*—Akm E. Ullah
*Attorney, Agent, or Firm*—Pollock, Vande Sande & Priddy

[57] ABSTRACT

In an optical fiber connector member with a precision fit external conical surface at its front end, the fiber core is adjustable for centering during mounting by first fixing the fiber in an adjuster member inserted in the connector member, and bears with its nose against the inside of the connector member at a point somewhat inwards from the outer end of the fiber. The adjuster member pivots about its bearing point until the fiber core is correctly positioned, and is then fixed, with glue, for example.

9 Claims, 2 Drawing Figures

METHOD FOR CONNECTING AN OPTICAL FIBER AND CONNECTING MEMBER AND MOUNTING MEANS FOR CARRYING OUT SAID METHOD

FIELD OF THE INVENTION

The invention relates to a method for mounting an optical fiber and centering the core of an optical fiber in a connector member, as well as to a connector member for optical fibers which is adapted to the method and a mounting means designed for said mounting.

BACKGROUND OF THE INVENTION

The mounting of an optical fiber in a connector member which has a centering surface at one end, in the form of a truncated external cone, is known for example, from applicant's U.S. Pat. No. 4,490,006, which is incorporated herein by reference. The invention can also be applied to other types of rotationally symmetrical fitting surfaces, e.g., right-cylindrical surfaces.

The known method makes it possible to use purely mechanical means to achieve centering of an optical fiber, so that it will be right on the axis of the surface of revolution. This centering will be with respect to the outer, essentially cylindrical surface of the fiber. For fibers for larger dimensions of step index type, this known method is completely satisfactory as regards accuracy. Difficulties arise, however, when it comes to centering optical fibers where the fiber core diameter is 50 μm or less. Examples of such fibers are gradient index fibers in which the index of refraction gradually decreases from the center outwards, and single mode filters which have a core of approximately 10 μm with one index of refraction and a jacket with a lower index of refraction.

The gradient index fiber is usually manufactured by coating the inside of a quartz tube from the vapor phase with a doped quartz sublimate which more or less continuously increases an index of refraction towards the center of the tube. Melting then causes the hole in the tube to close so that a solid quartz rod is obtained which is then drawn out to form a fiber. The single mode fiber is drawn from a double pot; molten quartz is allowed to run out of a hole forming a string which is surrounded by another type of molten quartz in an annular gap, and the running quartz string is then drawn out into a fiber. (These descriptions are of course only very rough descriptions.)

In both cases it is difficult to keep the fiber entirely rotationally symmetrical with regard to the center zone with the highest index of refraction, the core of the fiber. For example, a single mode fiber can have a diameter of 100 μm and a core of 10 μm in diameter which is often off-center by 3 μm for a gradient index fiber, the usual diameter is 125 μm, with an effective light transmission core diameter of 50 μm. In this case, ±3% is a normal manufacturing tolerance. For connecting two gradient index fibers, the error must be less than 5 μm to keep the loss under 1 dB. The problem of connecting single mode fibers is five times as difficult.

It will thus be appreciated that, when connecting optical fibers of this type, a centering which only takes into account the outer diameters cannot be considered satisfactory.

When connecting optical fibers with connectors, the Fresnel losses can amount to 0.35 dB, if the connection is made with an air gap. Better values can be obtained by filling the gap with a medium of matching index. This method must, however, often be rejected for practical reasons. It should be mentioned that a permanent juncture by fusing the fiber ends, which of course in principle should be without any loss, has in practice produced losses of several tenths of a decibel, due, among other things, to the asymmetrical position of the fiber core in relation to the outer diameter.

OBJECT OF THE INVENTION

It is a purpose of the present invention to achieve a simple low-loss connection of optical fibers, using disengageable connecting members, in contrast to the fusing method. It is a particular purpose of the invention to dissociate such connection, made with precision adapted connector members, from the previous dependence on the outer surface of the fiber, which is often not representative of the center point of the light being transported therein. According to the present invention, the fiber core is centered regardless of the outer diameter of the fiber.

A further purpose is to achieve a simple and inexpensive connection which can also be used for thicker fibers of step index type. According to the invention, no special precision fitting means are required beyond a well-defined surface of revolution to which an adaptation is made according to the invention. Connector members refer here to those designed for connecting one fiber to another as well as those designed for connection to components, e.g., radiation sources or detectors.

It is advisable to center the fiber core in the rotationally symmetrical member by optical observation, and to allow the outer surface of revolution of the connecting member to rest in a corresponding inner surface. Observation of the fiber end can be suitably carried out by a microscope with cross hairs or the like, marking a desired central placement of the fiber, and a two-dimensional manipulator to pivot the adjustment member until the core has been centered. A metal microscope is used, preferably of reflecting type, possibly with illumination through the lens. If illumination is done through the fiber, illumination through the lens is only required if the entire end surface of the member is to be observed for centering.

The gradient index fiber has as a rule in the center of the core a small anomaly corresponding to the point where the tube finally melted together. This anomaly serves well as a target for the cross hairs or other sighting means in the microscope, and appears as a dark point if the fiber is illuminated at the other end.

According to the mounting means of the invention, it is advisable to use, together with a microscope and an inner conical surface fitted to the external conical surface of the connector member, a manipulator of X-Y-board type, whereby the adjuster member can be pivoted in two mutually perpendicular directions. Other manipulating means used in microscopy can also be adapted to the use in question.

As an alternative to optical observation, electrical measurement for centering can be done by placing the adjustable member in a first cone of a double cone which has in its second cone a precision made conical reference gauge with a central hole adapted to the diameter of the fiber core. Through this hole, optical radiation can be detected from the fiber core and the core be adjusted to the center of the gauge by, for example, maximizing the detector current to a measuring instrument.

This method has a particular range of use for connecting IR-diodes and IR-lasers provided with fibers (pigtailed components).

This method of electrical measurement for centering should be applicable to automatic adjustment of the fiber core to the geometric axis of the member by servo control of the two axes of the X-Y-board.

It is also possible to center the adjuster member 9 to the center of the outer cone 16 by purely translational movement in the X-Y-plane, if the member is not in contact with the shoulder 10. This requires adjustment with an X-Y-board with a positioning accuracy of approximately 0.1 $\mu$m, and adjustment along the Z-axes will also be necessary. This centering variation will increase the cost of the adjustment means.

BRIEF DESCRIPTION OF THE DRAWINGS

The invention will now be described in the form of a non-limiting example with reference to he drawings.

DESCRIPTION OF PREFERRED EMBODIMENT

Figure 1:
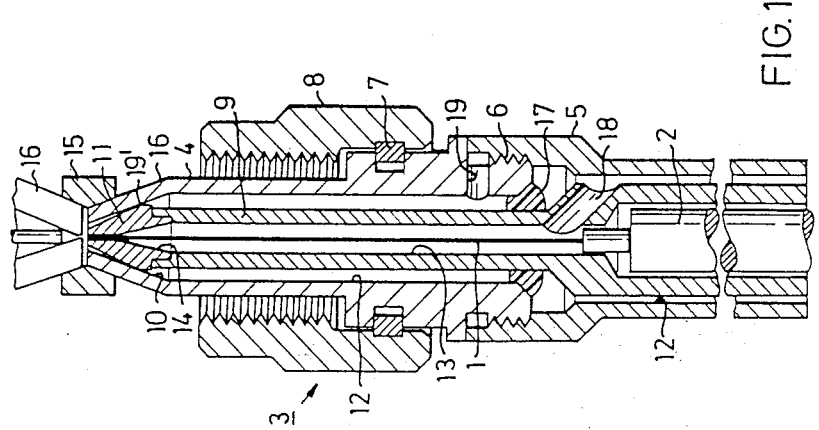
FIG. 1 shows in section and in enlarged scale a connector member mounted in place, connected as shown schematically here, to another similar member, e.g., a reference gauge.

FIG. 1 shows a connector member 3 in place with an optical fiber 1 mounted therein. The end of the fiber is stripped, i.e., the protective jacket 2 has been removed.

Similar to the prior art, the connector member 3 has at its point an outer cone 16 serving as a fitting surface to an inner cone in a gauge block 15 which has two concentric inner cones, and an opposed outer cone 16 of another connector member shown schematically. The outer cone 16 is a portion of a tube 4 on which there is a fixing nut 8. In the example shown, the fixing nut is connected to the tube 4 via a loose ring 7 in a groove, the fixing nut 8 is designed for fixing the connecting member to an intermediate piece (not shown), for example. The tube section 4 is extended with a second, screwed-on tube section 5, so that the member has a first part 4 and a second part 5, both with a through-hole 12. The hole in the first part 4 is tapered at the tip to form an interior approximately conical surface 10. An adjuster member 9, also with a through-hole 13, is inserted in the hole 12. The fiber 1 is inserted in the hole 13. The adjuster member 9 is sufficiently long to protrude out of the part 4 at the rear when the part 5 is not in place, but hardly protrudes, if at all, from the part 5 when it is screwed onto the thread 6. (Fastening by other means than threads, i.e., adhesive, is of course also possible.)

The adjuster member 9 is pointed at the end, with a mounted tip 11 in the example shown. The tip 11 is more bluntly tapered than the tapered surface 10 of the hole 12, and thus the adjuster member rests against the surface 10 somewhat inwards from the tip, in this case about 2 mm inwards.

When mounting and adjusting the connector member, the fiber 1 is stripped at the end and inserted in the adjuster member 9 in its hole 13 which is tapered at 14. It is advisable to coat the end of the fiber, with a thermosetting resin for example to fix it in the adjuster member and anchor the end at the tip. The rear part 5 is then slipped on outside the fiber coating 2 so as to be out of the way. The adjuster member 9 is then inserted in the front part 4 until the tip reaches the bottom. The front part is mounted in an inner cone in front of a microscope. It is now possible to move the fiber somewhat in relation to the axis of the outer cone 16, by allowing the adjuster member 9 to pivot, its point sliding where it rests against the surface 10. It is then possible to study in the microscope the fiber, which is preferably illuminated. This illumination can be effected from the opposite end of the fiber. It is also possible to allow a light beam to enter via the hole 18 in the adjuster member, this being suitable if the opposite end of the fiber is inaccessible, for example. The core of the fiber is centered to cross hairs in the microscope by a X-Y-board actuating the extension 21 of the adjuster member.

The adjuster member is then permanently fixed in place, e.g., with thermosetting resin at 17, for example, and the extension 21 is removed. Suitable thermosetting resins are known to those skilled in the art. The entire space between the part 4 and the adjuster member 9 may possibly be filled with thermosetting resin.

The rear part 5 is then screwed in place on the front part 4, thus concealing the adjuster member 9. It is then possible, if desired, to pinch the rear part 5 to remove mechanical pressure on the fiber cable 2 in a conventional manner.

Figure 2:
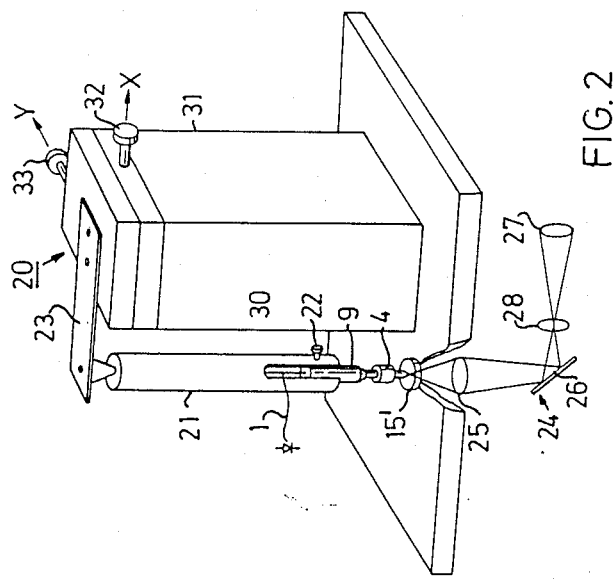
FIG. 2 shows schematically a connector member during mounting and a mounting means.

The means for adjustment shown in FIG. 2 is especially suited to this method. A so-called reversed metallographic microscope 24 has a lens (with 10× enlargement and N.A. 0.2, for example), a mirror 26 and an ocular 27, in front of which there are cross hairs or a measuring ring disc 28. The microscope is adjusted to view along the axis of an upwardly opening inner cone in a disc 15'. The part 4 is fixed with the nut 8 and the adjuster member 9, with the fiber 1 anchored therein, is inserted in the part 4. An extension arm 21 is fixed to the protruding rear end of the adjuster member by means of a screw 22. The extension arm 21 has at its end a slot 30 going through the center, so that the fiber 1 can exit to the side.

The microscope table has a column 31 at the top of which there is a common crossboard 20 with adjustment means in the form of knobs 32 and 33 for translational movement in two perpendicular directions. A resilient plate 23 which can be made to press against the free end of the extension arm 21 is mounted on the crossboard 20. By turning the knobs 32 and 33, the extension arm 21 and the adjuster member 9 can be pivoted against the surface 10 (FIG. 1), thereby adjusting the fiber as it is observed in the microscope.

The length of the extension arm can be 100 mm for example. As is already mentioned, the adjuster member bears against the surface 10 approximately 2 mm inwards from the tip. A movement of 0.01 mm on the crossboard results in an angular change of $10^{-4}$ rad., and the outer end of the fiber will move 0.2 $\mu$m. Since any play in the crossboard can be taken into account, it is clear that it is possible to carry out an adjustment to at least this accuracy.

It should be noted that the direction of the fiber does not change very much as the adjuster member 9 is pivoted. This is important since light transported in the fiber emerges in a certain direction (low numerical aperture, N.A. often of the order of magnitude 0.1). As was stated above, the required adjustment is often 3–5 $\mu$m. Moving the center of the fiber end 5 $\mu$m will result in an angular change of $2.5 \times 10^{-3}$ rad., which is substantially negligible relative to the numerical aperture.

It is also possible to use a microscope which can produce a conoscopic image (e.g., through an Amici-Bertrand lens), and thereby check, in the same apparatus, that the light emerging from the fiber end does not deviate in direction too much from the axis of symmetry of the connector member.

A particular embodiment of the invention involves the following steps. The stripped end of the fiber 1 is inserted in the adjuster member 9, which has first been filled with thermosetting resin (two-component adhesive of type Epotech 360 from Epoxy Technology, which sets at 120° C.). After setting, the protruding fiber end is cut off by first lightly scoring and then breaking. The adjuster member 9 is placed loosely in the front part 4, and the entire unit is sanded by hand from the front using sandpaper of decreasing coarseness in the usual manner to achieve an even surface structure of the fiber end. The unit is then mounted in an adjusting means as shown in FIG. 2, and a ring of adhesive of rather thick cyanacrylate adhesive (Tak Pak from Loctite) 17 (see FIG. 1) is applied, and adjustment is then carried out. After adjustment is completed, the cyanacrylate adhesive is set by applying the appropriate hardener, producing very rapid setting. The adjusted arrangement can then be removed and a thermosetting resin of the above-mentioned epoxy type injected in the space between the adjuster member 9 and the front end 4. Providing the nose portion at 19' with an axial groove enables the adhesive to penetrate to the tip. After hardening, the rear end can be screwed on and the fiber permanently fixed by clamping.

It should be noted that the adjuster member in FIG. 1 is made in two pieces, with a nose piece, because it would otherwise be difficult to drill a sufficiently small hole, of the size of the fiber. It is conceivable that the midportion of the adjuster member can be made of so-called cannular tubes and a somewhat heavier, specially-made tube attached in the other end, provided with the hole 18. The visible portions of the connector member should be made in stainless material which makes it easier to achieve precision tolerances since no particular surface treatment is necessary.

What I claim is:

1. Method for mounting an optical fiber and centering a core of said fiber in a connector member in which at a first end there is a fitting surface formed as a surface of revolution, whereby an end of said optical fiber stripped of protective covering is inserted in a through-hole in said connector member from an opposite end to said fitting surface and is fixed with said end in a centered position at the axis of the surface of revolution and is then anchored with a securing means, said method comprising the steps of
   (a) inserting in said through-hole, which is tapered at said first end to form a shoulder, an adjuster member provided with a through-hole, a first end of said adjuster member at said first end of said connector member being more bluntly tapered than said first-mentioned through-hole;
   (b) bringing said first end of said adjuster member to bear against said shoulder at a position located inwardly of said first end of said connector member;
   (c) bringing said fiber end inserted in said through-hole in said adjuster member to the centered position of such fiber end by pivoting said adjuster member, which only bears against said shoulder, from the other, opposite end of said adjuster member, while sliding against said shoulder, until the end of said fiber core has assumed a position centered in said surface of revolution; and
   (d) permanently fixing said adjuster member in said connector member.

2. Method according to claim 1, comprising the steps of arranging an observation instrument in order to observe, from outside said first end of said connector means, said end of said fiber, and coupling said adjuster member to an adjustment instrument, adjustable in at least two dimensions for independent pivoting of said adjuster member in two separate planes.

3. Method according to claim 1 or 2, wherein said connector member is mounted with said surface of revolution at its first end inserted in a surface of revolution adapted thereto.

4. Method according to claim 2, wherein said observation instrument used is a metallographic microscope.

5. Method according to claim 2, wherein said observation instrument used is a microscope focused on the end of said fiber so that the position thereof can be determined.

6. Method according to claim 5, wherein, the opposite end of said fiber being inaccessible, said fiber is illuminated from its outside through a hole in said adjuster member.

7. Connector member for centering and mounting an optical fiber, and which has a through-hole, a first end of said connector member having a fitting surface which is a surface of revolution for centered engagement against a fitting surface which fits said surface of revolution, as well as removable holding means, said connector member comprising
   (a) a first part including said first end of said member;
   (b) a second extension part attachable thereto; and
   (c) an adjuster member provided with a through-hole for holding said fiber and insertable in the hole which passes through said first and second parts, said through-hole in said first part having a portion which is located at said first end and tapers towards said end to form a shoulder, said adjuster member being more bluntly tapered on the outside of is first end than said tapered portion of said hole in said first part so that said adjuster member can be inserted in said hole, be disposed in contact with said shoulder at a position spaced somewhat from said first end of said first part, and be pivoted while maintaining such contact, the length of said adjuster member being sufficient to project from said first part when said second part is removed.

8. Connector member according to claim 7, wherein said through-hole of said adjuster member has a side opening at a location which is exposed when said adjuster member is inserted in said first part and said second part is removed.

9. Mounting means for use in mounting a connector member for centering and mounting an optical fiber, comprising a plate with a rotationally symmetrical, outwardly opening hole for insertion of a corresponding fitting surface on a connector member, a microscope arranged to observe an end of an optical fiber arranged in said connector member, an adjuster member extension one end of which is arranged to be fastened to an adjuster member in said connector member, and pivot adjuster means acting at the other end thereof and movable in two directions perpendicular to said adjuster member extension which is provided with a cavity for an optical fiber emerging from said adjuster member.

* * * * *